(12) United States Patent
Chandhoke

(10) Patent No.: US 8,175,725 B2
(45) Date of Patent: May 8, 2012

(54) ADAPTING MOVE CONSTRAINTS FOR POSITION BASED MOVES IN A TRAJECTORY GENERATOR

(75) Inventor: Sundeep Chandhoke, Austin, TX (US)

(73) Assignee: National Instruments Corporation, Austin, TX (US)

( * ) Notice: Subject to any disclaimer, the term of this patent is extended or adjusted under 35 U.S.C. 154(b) by 883 days.

(21) Appl. No.: 12/206,028

(22) Filed: Sep. 8, 2008

(65) Prior Publication Data

US 2010/0063603 A1   Mar. 11, 2010

(51) Int. Cl.
   *G05B 13/02*   (2006.01)
(52) U.S. Cl. .............................. 700/34; 700/33; 700/63
(58) Field of Classification Search ................. 700/33, 700/34, 37, 63; 318/560, 561, 568.18
   See application file for complete search history.

(56) References Cited

U.S. PATENT DOCUMENTS

| | | | |
|---|---|---|---|
| 3,970,830 A | 7/1976 | White et al. | |
| 4,769,583 A | 9/1988 | Goor | |
| 5,331,264 A | 7/1994 | Cheng et al. | |
| 5,508,596 A | 4/1996 | Olsen | |
| 5,684,375 A | 11/1997 | Chaffee et al. | |
| 5,726,896 A | 3/1998 | Jia et al. | |
| 6,242,880 B1 | 6/2001 | Hong | |
| 6,782,306 B2 | 8/2004 | Yutkowitz | |
| 6,784,903 B2 | 8/2004 | Kodosky et al. | |
| 6,865,441 B2 | 3/2005 | Chandhoke | |
| 6,971,066 B2 | 11/2005 | Schultz et al. | |
| 7,076,322 B2 | 7/2006 | Chandhoke | |
| 7,369,917 B2 | 5/2008 | Ravish et al. | |
| 7,702,416 B2 | 4/2010 | Ravish et al. | |
| 7,702,417 B2 | 4/2010 | Ravish et al. | |
| 7,849,416 B2 | 12/2010 | Chandhoke et al. | |
| 2003/0144751 A1 | 7/2003 | Chandhoke et al. | |
| 2003/0193522 A1* | 10/2003 | Chandhoke | 345/764 |
| 2007/0085850 A1* | 4/2007 | Hong et al. | 345/442 |
| 2009/0051310 A1 | 2/2009 | Chandhoke | |

(Continued)

OTHER PUBLICATIONS

Masri Ayob and Graham Kendall; "A New Dynamic Point Specification Approach to Optimise Surface Mount Placement Machine in Printed Circuit Board Assembly"; Industrial Technology, 2002; IEEE International Conference on vol. 1; Dec. 2002; 6 pages.

(Continued)

*Primary Examiner* — Albert Decady
*Assistant Examiner* — Steven Garland
(74) *Attorney, Agent, or Firm* — Meyertons Hood Kivlin Kowert & Goetzel, P.C.; Jeffrey C. Hood; Joel L. Stevens

(57) ABSTRACT

Adapting move constraints for position based moves in a trajectory generator. Specification of a trajectory may be received. The specification may include a geometry of the trajectory, where the geometry specifies a desired trajectory length. A plurality of constraints for the trajectory may be received. The plurality of constraints may include one or more of a velocity, acceleration, or jerk constraint. A motion control profile may be generated based on the plurality of constraints. The method may include determining if a distance of the motion control profile exceeds the desired trajectory length. If the distance of the motion control profile exceeds the desired trajectory length, one or more values of the plurality of constraints may be decreased to make the distance of the motion control profile less than or equal to the desired trajectory length.

22 Claims, 3 Drawing Sheets

U.S. PATENT DOCUMENTS

2009/0105883 A1* 4/2009 Miller et al. .................. 700/275
2009/0144647 A1   6/2009 Chandhoke
2010/0036510 A1* 2/2010 Cullen ............................ 700/37

OTHER PUBLICATIONS

Sundeep Chandhoke, Z. Qu, J.H. Kaloust, and H. Cai; "Toward an Integrated Curriculum of Systems, Controls, and Machinary"; Southcon/95; Conference Record Mar. 7-9, 1995; 4 pages.

Jozsef Laczko, Slobodon Jaric, Dmitry Domkin, Hakan Johansson, and Mark L. Latash; "Stabilization of Kinematic Variables in the Control of Bimanual Pointing Movements"; Neural Networks 2001, Proceedings IJCNN '01; Jul. 15-19, 2001; 5 pages.

Hanspeter Schaub, Maruthi R. Akella, and John L. Junkins; "Adaptive Control of Nonlinear Attitude Motions Realizing Linear Closed-Loop Dynamics"; American Control Conference, Jun. 2-4, 1999; 5 pages.

* cited by examiner

ADAPTING MOVE CONSTRAINTS FOR POSITION BASED MOVES IN A TRAJECTORY GENERATOR

FIELD OF THE INVENTION

The present invention relates to the field of motion control, and more particularly to a system and method for adapting move constraints for position based moves in a trajectory generator.

DESCRIPTION OF THE RELATED ART

Motion control has becoming an important field in present industry. One of the most critical components of a motion controller is its trajectory generator. The implementation of the trajectory generator becomes highly complicated if it needs to support s-curve profile generation for position based moves, e.g., which include pre-emption. For these position based moves, along with the geometrical (position) parameters, constraints may also be specified (e.g., by a user) for the move: velocity, acceleration, deceleration, acceleration jerk (rate of change of acceleration) and deceleration jerk (rate of change of deceleration). The expectation of the user is that these specified constraints are never exceeded and a smooth profile is generated by the motion controller. However, since these constraints are typically entered independently from the position values, the solution of the kinematic equations can result in the distance being covered to exceed that specified. This results in the move being terminated before the velocity reaches zero, causing a violation of the deceleration constraints. Thus, improvements in trajectory generation are desired.

SUMMARY OF THE INVENTION

Various embodiments are presented of a system and method for adapting move constraints for position based moves in a trajectory generator.

Specification of a trajectory or move may be received (e.g., by a user). The specification may include a geometry of the trajectory, which may specify a desired trajectory length.

A plurality of constraints may be received for the trajectory (e.g., by the user). The plurality of constraints may include a velocity, acceleration, deceleration, jerk acceleration, and/or jerk deceleration constraint.

A motion control profile may be generated based on the plurality of constraints. In some embodiments, the motion control profile may only be generated based on the plurality of constraints (e.g., using s-curve kinematic equations) or may be generated based on the constraints as well as the trajectory specification.

The method may include determining if a distance of the motion control profile exceeds the desired trajectory length. Determining if the distance of the motion control profile exceeds the desired trajectory length may include determining a plurality of distance equations based on the motion control profile, which may each specify distance based on one or more of the plurality of constraints. Correspondingly, determining if the distance exceeds the desired distance may also include determining if the sum of the distance equations is greater than the desired trajectory length.

For example, a plurality of kinematic equations may be determined according to an s-curve algorithm. The kinematic equations may include:

$$t_1 = A_{max}/J_a = t_3$$

$$t_2 = \frac{V_{max} - V_{ini}}{A_{max}} - \frac{A_{max}}{J_a}$$

$$t_5 = D_{max}/J_d = t_7$$

$$t_6 = \frac{V_{max} - V_{fin}}{D_{max}} - \frac{D_{max}}{J_d}$$

Using these equations, determining if the distance of the motion control profile exceeds the desired trajectory length may include determining if $$\frac{V_{max} - V_{ini}}{A_{max}} < \frac{A_{max}}{J_a}$$

is true, and reducing $A_{max}$ until it is not true. Similarly, determining if the distance of the motion control profile exceeds the desired trajectory length may include determining if $$\frac{V_{max} - V_{fin}}{D_{max}} < \frac{D_{max}}{J_d}$$

is true, and reducing $D_{max}$ until it is not true.

Furthermore, determining if the distance of the motion control profile exceeds the desired trajectory length may include determining the sum of the following plurality of distance equations for the s-curve equations:

$$s_1 = \frac{1}{6} Ja \cdot t_1^3 + V_{ini} \cdot t_1$$

$$s_2 = \frac{1}{2} Ja \cdot (t_1^2 \cdot t_2 + t_2^2 \cdot t_1) + V_{ini} \cdot t_2$$

$$s_3 = Ja \cdot \left(t_1^2 \cdot t_2 + \frac{5}{6} t_1^3\right) + V_{ini} \cdot t_1$$

$$s_5 = Jd \cdot \left(t_5^2 \cdot t_6 + \frac{5}{6} t_5^3\right) + V_{fin} \cdot t_5$$

$$s_6 = \frac{1}{2} Jd \cdot (t_5^2 \cdot t_6 + t_6^2 \cdot t_5) + V_{fin} \cdot t_6$$

$$s_7 = \frac{1}{6} Jd \cdot t_5^3 + V_{fin} \cdot t_5$$

If the distance of the motion control profile exceeds the desired trajectory length, one or more values of the plurality of constraints may be decreased for the trajectory to make the distance of the motion control profile less than or equal to the desired trajectory length. In some embodiments, decreasing the constraints may include reducing the acceleration $A_m$ such that $s_1$ and $s_3$ cover less than half of the desired trajectory length and/or reducing the deceleration $D_m$ such that $s_5$ and $s_6$ cover less than half of the desired trajectory length.

Additionally, if the distance of the motion control profile exceeds the desired trajectory length after reducing the acceleration and reducing the deceleration, the method may include reducing the maximum velocity ($V_{max}$), acceleration jerk ($J_a$), and/or deceleration jerk ($J_d$) until the motion control profile is less than or equal to the desired trajectory length.

BRIEF DESCRIPTION OF THE DRAWINGS

A better understanding of the present invention can be obtained when the following detailed description of the preferred embodiment is considered in conjunction with the following drawings, in which.

Figure 1:
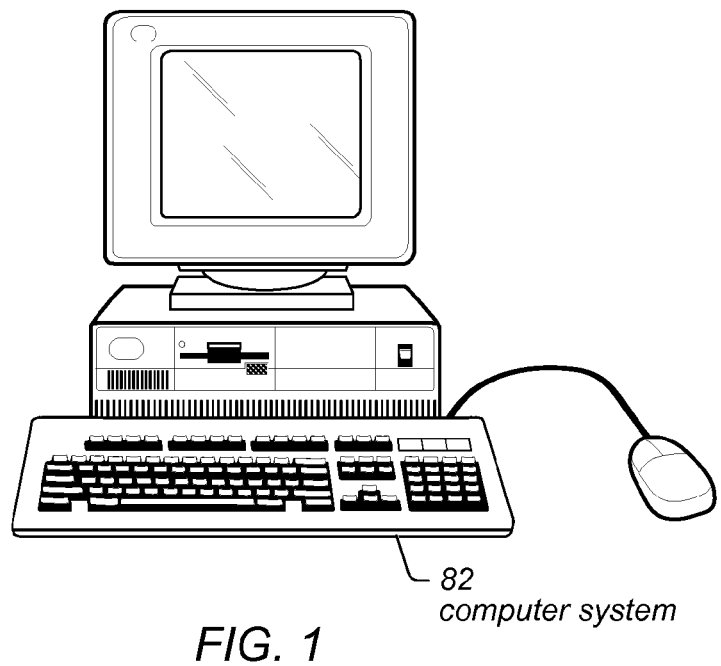
FIG. 1 illustrates a computer system, according to an embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference:

The following references are hereby incorporated by reference in their entirety as though fully and completely set forth herein:

U.S. Pat. No. 6,865,441 titled "Parallel Loops for Trajectory Generation, Spline Interpolation and Control for a Motion Control Application", issued on Mar. 8, 2005.

U.S. patent application Ser. No. 11/226,863, titled "Automatic Generation of a Motion Controller", filed on Sep. 14, 2005.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Subset—in a set having N elements, the term "subset" comprises any combination of one or more of the elements, up to and including the full set of N elements. For example, a subset of a plurality of icons may be any one icon of the plurality of the icons, any combination of one or more of the icons, or all of the icons in the plurality of icons. Thus, a subset of an entity may refer to any single element of the entity as well as any portion up to and including the entirety of the entity.

FIG. 1—Computer System

FIG. 1 illustrates a computer system 82 operable to generate trajectories for motion control, according to various embodiments described herein.

As shown in FIG. 1, the computer system 82 may include a display device operable to display a graphical user interface (GUI) for a motion controller or for receiving specification of a desired trajectory. The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store various programs for performing motion controller, controlling a motion controller, generating or modifying trajectories, etc. The memory medium may also store operating system software, as well as other software for operation of the computer system. Various embodiments further include receiving or storing instructions and/or data implemented in accordance with the foregoing description upon a carrier medium.

However, it should be noted that the computer system 82 may be implemented as a motion controller, e.g., on a card inserted in a chassis, among other configurations. Thus, the functionality of the computer system 82 may be on any of various devices.

Figure 2:
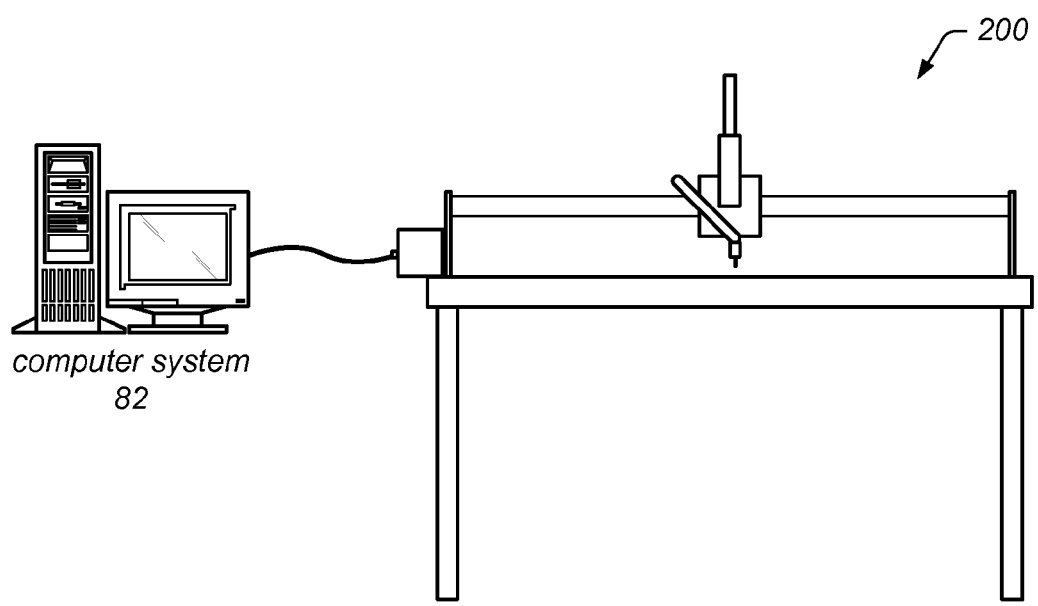
FIG. 2 illustrates a computer system coupled to a motion controller, according to one embodiment.

FIG. 2—Motion System

FIG. 2 illustrates a system including a first computer system 82 that is coupled to motion system 200. The computer system 82 and motion system 200 may each be any of various types, as desired. For example, the motion system 200 may include a motion controller (unless the computer system 82 implements the motion controller, e.g., as a card included in the computer system 82). The motion system 200 may include a plurality of motors for receiving move information, e.g., from the computer system 82, and then executing the received move information. For example, the move information may include velocity, position, acceleration, and/or jerk information for implementing the move. The move information may be split among various motors, e.g., corresponding to different axis movements. The motion system 200 may be an etching motion system, a cutting motion system, a tracing motion system, and/or other types of motion system which moves along a trajectory.

The computer system 82 may be coupled via a network (or a computer bus) to the motion system 200. The network can also be any of various types, including a LAN (local area network), WAN (wide area network), the Internet, or an Intranet, among others. The computer system 82 and the motion system 200 may perform a motion task in a distributed fashion. For example, computer 82 may execute a trajectory for the motion system 200 and the motion system 200 may perform implement the generated trajectory.

FIG. 3—Flowchart

Figure 3:
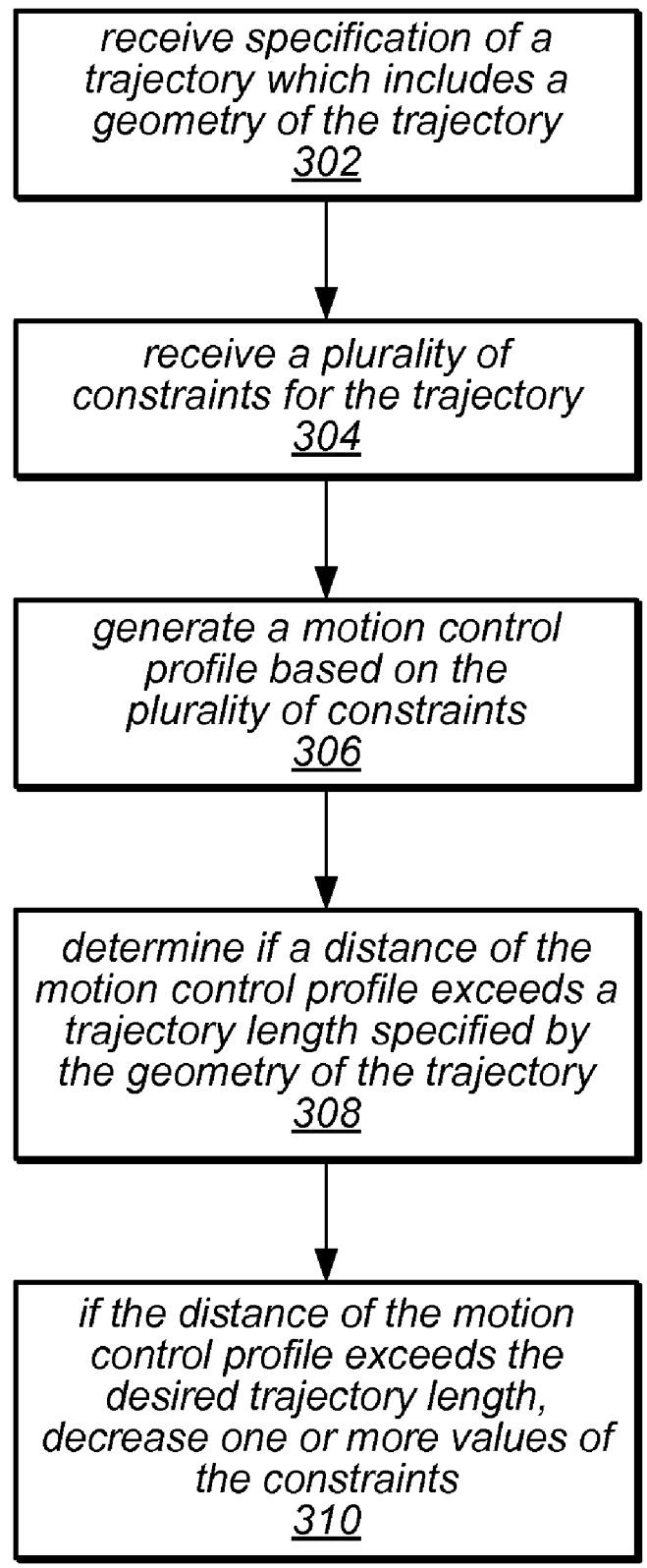
FIG. 3 is a flowchart diagram illustrating one embodiment of a method for adapting move constraints for position based moves in a trajectory generator.

FIG. 3 illustrates a method for adapting move constraints for position based moves in a trajectory generator. The method shown in FIG. 3 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 302, a specification of a trajectory may be received (e.g., by a user). In one embodiment, the specification may include a plurality of moves for the motion system, or may be a single move, as desired. Thus, in some embodiments, the method described herein may be performed a plurality of times to fully specify a trajectory (e.g., a move or portion of the trajectory at a time).

The specification may include a geometry of the trajectory. For example, the geometry may be an arc, a line, and/or other geometries. Thus, the user may enter various parameters describing the geometry of the trajectory, e.g., by specifying various positions, such as the initial position, the radius and travel angle of the arc. Alternatively, the user may provide a plurality of positions, e.g., which may to be blended together or sequentially executed. In one embodiment, the user may specify a desired trajectory length, although this desired trajectory length may alternatively be determined based on the specified geometry of the trajectory.

In 304, a plurality of constraints for the trajectory may be received, e.g., from a user. The plurality of constraints may include velocity (e.g., initial and final velocity), acceleration, deceleration, jerk acceleration, and/or jerk deceleration, among other possible constraints. Note that the reception of the plurality of constraints and the specification of the trajectory may be received in an independent fashion. For example, the user may be requested to provide the specification of the trajectory (e.g., including the position values for the geometry of the trajectory) in 302 and then in 304, may separately provide the constraints for the trajectory. These constraints may be based on the limitations of the specific motors being used by the motion system. For example, the motor may not be able to consistently provide accelerations greater than a maximum threshold (similar for other constraints, such as deceleration, jerk acceleration, jerk deceleration, velocity, etc.). In some embodiments, the constraints may be specific to various motors used in the system. For example, there may be different constraints for x-axis movement (corresponding to the motor controlling x-axis movement) as opposed to those for y-axis movement (corresponding to the motor controlling the y-axis movement). Thus, different constraints may be provided for different axes, motors, etc. Thus, in some embodiments, the specification of the desired trajectory (which may depend on the requirements for the current motion control project) may be provided independent from the constraints for the trajectory (which may depend on the requirements or limitations of the motors implementing the motion control trajectory).

In 306, a motion control profile may be generated or calculated (e.g., automatically by the computer system 82 described above) based on the plurality of constraints. As used herein "automatic" refers the process where a computer system or other device performs an action without requiring specific user input specifying the action. For example, in the generation of the motion control profile in 306, a user may not manually specify the motion control profile or be involved in the process at all, other than providing the desired trajectory and constraints in 302 and 306. Thus, while an automatic process may be triggered by a user, the automatic process is not undertaken by the user.

Figure 4:
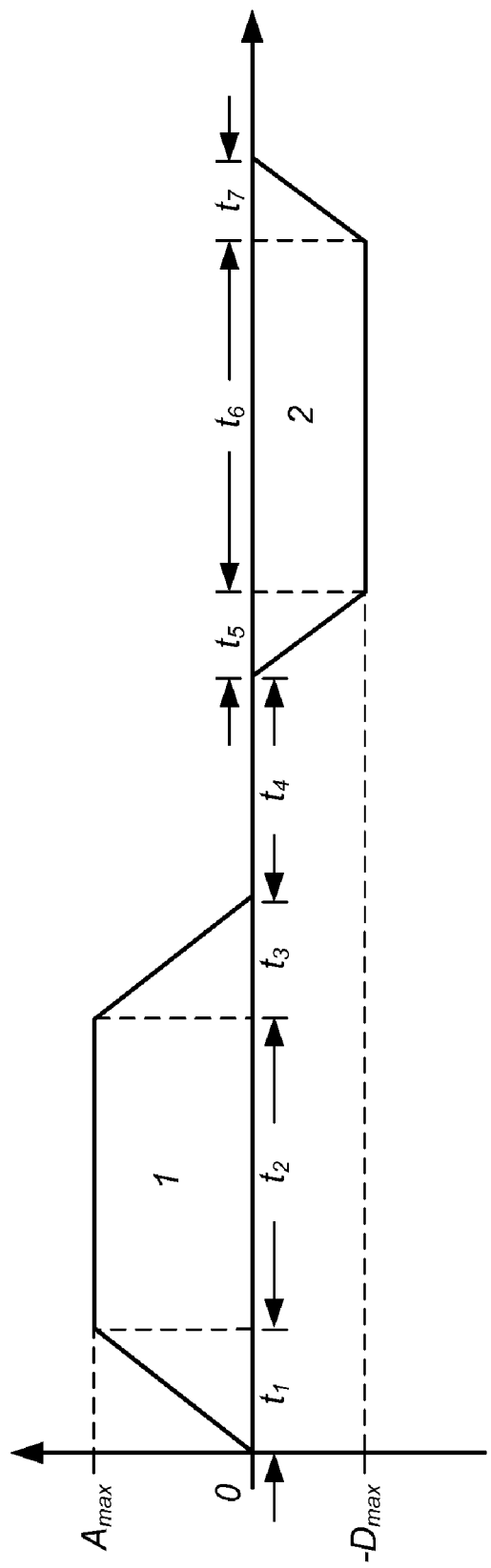
FIG. 4 is an s-curve acceleration profile of an exemplary trajectory, according to one embodiment.

The motion control profile may include a plurality of instructions to be provided to motors of the motion system (e.g., the motion system 200 from above). The plurality of instructions may include specified velocities, accelerations, decelerations, jerk accelerations, jerk declarations, times for various ones of these velocities, accelerations, decelerations, etc. and/or other information. FIG. 4 illustrates an exemplary s-curve acceleration graph of for an exemplary curve trajectory. As shown, during $t_1$, acceleration may increase from 0 to $A_{max}$; during $t_2$, the acceleration may be held constant at $A_{max}$ (max acceleration); during $t_3$, acceleration may decrease to 0; during $t_4$, acceleration may be held constant at 0; during $t_5$, acceleration may be decreased to $D_{max}$ (max deceleration); during $t_6$, acceleration may be held constant at $D_{max}$; and during $t_7$, acceleration may be increased to 0. Thus, during $t_1$, acceleration is increased at a specified rate; during $t_2$, acceleration may remain constant; during $t_3$, acceleration may be decreased at a specified rate; during $t_4$, the axis may be moved at a specified maximum velocity (sometimes referred to as a cruise time period); during $t_5$, deceleration may be increased based on a specified rate; during $t_6$, deceleration may remain constant; and during $t_7$, deceleration may be decreased at a specified rate.

In some embodiments, the motion control profile may be generated only using the plurality of constraints and not based on the specification of the trajectory. However, in some embodiments, various amounts of information used of the specified trajectory. For example, the motion control profile may be only based on the specified constraints and the identification of the particular type of trajectory. In other embodiments, more of the specified trajectory information may be used for the generation of the motion control profile.

In one embodiment, the motion control profile may be generated using an s-curve algorithm, e.g., already calculated kinematic equations. These kinematic equations may only depend on the particular constraints provided in 304 rather than the geometries specified in 302. Thus, in some cases, the generated motion control profile may result in a trajectory distance which exceeds the desired trajectory length (e.g., as specified in 302 or calculated from the specified trajectory of 302). The following provide exemplary kinematic equations corresponding to the s-curve acceleration profile provided in FIG. 4:

$$t_1 = A_{max} / J_a = t_3$$

$$t_2 = \frac{V_{max} - V_{ini}}{A_{max}} - \frac{A_{max}}{J_a}$$

$$t_5 = D_{max} / J_d = t_7$$

$$t_6 = \frac{V_{max} - V_{fin}}{D_{max}} - \frac{D_{max}}{J_d}$$

where: $A_{max}$ is maximum acceleration, $D_{max}$ is maximum deceleration, $V_{max}$ is maximum velocity, $V_{ini}$ is initial velocity, $V_{fin}$ is final velocity, $J_a$ is maximum acceleration jerk (rate of change of acceleration), and $J_d$ is max deceleration jerk (rate of change of deceleration).

Prior motion systems typically use such a generated motion control profile without modification. However, in such systems, when the desired trajectory length is reached, the current move is halted even in cases where the motion control profile is not completed. In these cases (sometimes referred to as "overshoot" cases), the prior motion systems violate the specified deceleration and/or jerk deceleration constraints since the velocity would decrease from a non-zero value to a zero value very quickly. Thus, in order for a user to ensure that such cases did not occur, the user would have to specify constraints which resulted in a motion control profile whose distance was equal to or less than the specified or calculated desired trajectory length, which is a complex problem.

Accordingly, in 308, it may be determined if a distance of the motion control profile exceeds a trajectory length specified by the geometry of the trajectory. This determination may be performed automatically, e.g., by the computer system 82 from above, in response to the generation of the motion control profile in 306 above. In some embodiments, determining if the distance of the motion control profile exceeds the desired trajectory length may include determining or using a plurality of distance equations based on the motion control profile. Each of the distance equations may specify based on or more of the plurality of constraints specified in 304. For example, the distance equations may be derived from the kinematic equations above. In one embodiment, these distance equations (corresponding to each time period) may be:

$$s_1 = \frac{1}{6} J_a \cdot t_1^3 + V_{ini} \cdot t_1$$

$$s_2 = \frac{1}{2} J_a \cdot (t_1^2 \cdot t_2 + t_2^2 \cdot t_1) + V_{ini} \cdot t_2$$

$$s_3 = J_a \cdot \left( t_1^2 \cdot t_2 + \frac{5}{6} t_1^3 \right) + V_{ini} \cdot t_1$$

$$s_5 = J_d \cdot \left( t_5^2 \cdot t_6 + \frac{5}{6} t_5^3 \right) + V_{fin} \cdot t_5$$

$$s_6 = \frac{1}{2} J_d \cdot (t_5^2 \cdot t_6 + t_6^2 \cdot t_5) + V_{fin} \cdot t_6$$

$$s_7 = \frac{1}{6} J_d \cdot t_5^3 + V_{fin} \cdot t_5$$

Thus, determining if the distance from the motion control profile is greater than the desired trajectory length may include summing the above equations and comparing that distance to the desired trajectory length specified or derived in 302 above.

In 310, if the distance of the motion control profile exceeds the desired trajectory length, one or more values of the constraints may be decreased to make the distance of the motion control profile less than or equal to the desired trajectory length. In some embodiments, one or more of the following procedures may be implemented:

From the kinematic equations that calculate $t_2$ and $t_6$, it can be seen that time in these segments becomes negative if:

$$\frac{V_{max} - V_{ini}}{A_{max}} < \frac{A_{max}}{J_a} \text{ or }$$

$$\frac{V_{max} - V_{fin}}{D_{max}} < \frac{D_{max}}{J_d}$$

Since in these cases $t_2$ and $t_6$ are non-real, the constraints need to be adjusted to ensure the motion control profile distance is less than or equal to the desired trajectory length. In order to address the first case, $A_{max}$ may be reduced until the value of $t_2$ is greater than or equal to zero. Similarly, for the second case, $D_{max}$ may be reduced until $t_6$ becomes greater than or equal to zero. Note that $V_{max}$ may also be increased to address this issue; however, this would violate the provided constraints and correspondingly is not a viable option.

Alternatively or additionally, the acceleration, $A_{max}$, may be reduced such that $s_1$ and $s_3$ cover less than half of the desired trajectory length (although other ratios or fractions are envisioned). Half may be used in some embodiments since there may always be a minimum of two phases (acceleration and deceleration).

Similarly, the deceleration, $D_{max}$, may be reduced such that $s_5$ and $s_6$ cover less than half of the desired trajectory length (similar to above, other ratios or fractions are envisioned).

Further, after coercion of $A_{max}$ and $D_{max}$, if the sum of the "non-cruise" portion $(s_1+s_2+s_3+s_5+s_6+s_7)$ or simply the entire motion control length is not less than the desired trajectory length, the maximum velocity, $V_{max}$, acceleration jerk, $J_a$, and deceleration jerk, $J_d$ may be reduced until this requirement is met. Note that while the various constraint adjustments may be performed in any order, it may be particularly useful to perform the reduction of the $A_{max}$ and then $D_{max}$ followed by the check before reduction of $V_{mzx}$, $J_a$, and $J_d$ in the described order.

Thus, the above described method allows for the coercing the move constraints for position based moves (e.g., in real time) such that when the final position is reached the velocity is zero. This ensures that no move constraints are violated at any time. This is achieved while ensuring that the move constraints (e.g., specified by the user) are not exceeded.

Finally, it should be noted that the above method may be performed prior to implementing the motion control profile in the motion system (e.g., during set up of the desired trajectory or moves) or in real time. For example, the steps described above may be performed in response to the receipt of a trajectory or move while the motion system is actively operating. Thus, the various constraint parameters may be coerced to ensure that the specified constraints are not exceeded in real time or "on the fly". This may be especially useful in systems which support pre-emption where a current move may be interrupted with a new move, and thus the new motion control profile may be modified according to the method described above for the new move.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A method for generating a trajectory for motion control, comprising:
    receiving specification of the trajectory, wherein said receiving the specification comprises receiving a geometry of the trajectory, wherein the geometry specifies a desired trajectory length;
    receiving a plurality of constraints for the trajectory, wherein the plurality of constraints comprise one or more of a velocity, acceleration, deceleration, jerk acceleration, or jerk deceleration constraint;
    generating a motion control profile based on the plurality of constraints;
    determining if a distance of the motion control profile exceeds the desired trajectory length specified by the geometry of the trajectory;
    in response to the distance of the motion control profile exceeding the desired trajectory length, decreasing one or more values of the plurality of constraints for the trajectory to make the distance of the motion control profile less than or equal to the desired trajectory length.

2. The method of claim 1, wherein said determining if the distance of the motion control profile exceeds the desired trajectory length comprises:
    determining a plurality of distance equations based on the motion control profile, wherein the plurality of distance equations each specify distance based on one or more of the plurality of constraints; and
    determining if a sum of the distance equations is greater than the desired trajectory length.

3. The method of claim 1, wherein said receiving the specification and said receiving the plurality of constraints is from a user.

4. The method of claim 1, wherein the plurality of constraints comprise: velocity, acceleration, deceleration, acceleration jerk, and deceleration jerk.

5. The method of claim 1, wherein said generating the motion control profile comprises using an s-curve algorithm.

6. The method of claim 5, wherein said determining if the distance of the motion control profile exceeds the desired trajectory length comprises:
    determining a plurality of kinematic equations for the motion control profile, wherein the plurality of kinematic equations comprise:

$$t_1 = A_{max} / J_a = t_3$$
$$t_2 = \frac{V_{max} - V_{ini}}{A_{max}} - \frac{A_{max}}{J_a}$$
$$t_5 = D_{max} / J_d = t_7$$
$$t_6 = \frac{V_{max} - V_{fin}}{D_{max}} - \frac{D_{max}}{J_d}$$

wherein $A_{max}$ is maximum acceleration;
wherein $D_{max}$ is maximum deceleration;
wherein $J_a$ is maximum acceleration jerk;
wherein $J_d$ is maximum deceleration jerk
wherein $V_{max}$ is maximum velocity;
wherein $V_{ini}$ is initial velocity;
wherein $V_{fin}$ is final velocity; and
wherein $t_1$, $t_2$, $t_3$, $t_5$, $t_6$ and $t_7$ are respective time periods.

7. The method of claim 6, wherein said determining if the distance of the motion control profile exceeds the desired trajectory length comprises:
    determining if equation 1, $$\frac{V_{max} - V_{ini}}{A_{max}} < \frac{A_{max}}{J_a}$$

is true;
    wherein said decreasing the one or more values of the plurality of constraints comprises reducing $A_{max}$ in response to determining that the equation 1 is true.

8. The method of claim 6, wherein said determining if the distance of the motion control profile exceeds the desired trajectory length comprises:
    determining if equation 2, $$\frac{V_{max} - V_{fin}}{D_{max}} < \frac{D_{max}}{J_d}$$

is true;
    wherein said decreasing the one or more values of the plurality of constraints comprises reducing $D_{max}$ in response to determining that the equation 2 is true.

9. The method of claim 6, wherein said determining if the distance of the motion control profile exceeds the desired trajectory length comprises:

determining a sum of a plurality of distance equations for the motion control profile, wherein the plurality of distance equations comprise:

$$s_1 = \frac{1}{6} Ja \cdot t_1^3 + V_{ini} \cdot t_1$$

$$s_2 = \frac{1}{2} Ja \cdot (t_1^2 \cdot t_2 + t_2^2 \cdot t_1) + V_{ini} \cdot t_2$$

$$s_3 = Ja \cdot \left(t_1^2 \cdot t_2 + \frac{5}{6} t_1^3\right) + V_{ini} \cdot t_1$$

$$s_5 = Jd \cdot \left(t_5^2 \cdot t_6 + \frac{5}{6} t_5^3\right) + V_{fin} \cdot t_5$$

$$s_6 = \frac{1}{2} Jd \cdot (t_5^2 \cdot t_6 + t_6^2 \cdot t_5) + V_{fin} \cdot t_6$$

$$s_7 = \frac{1}{6} Jd \cdot t_5^3 + V_{fin} \cdot t_5$$

wherein $s_1$, $s_2$, $s_3$, $s_5$, $s_6$ and $s_7$ are respective distances Ja is acceleration jerk; and Jd is deceleration jerk.

10. The method of claim 9, wherein said decreasing one or more values of the plurality of constraints comprises:
  reducing the acceleration $A_{max}$ such that $s_1$ and $s_3$ cover less than half of the desired trajectory length; and
  reducing the deceleration $D_{max}$ such that $s_5$ and $s_6$ cover less than half of the desired trajectory length.

11. The method of claim 10, wherein the method further comprises:
  in response to the distance of the motion control profile exceeding the desired trajectory length, after said reducing the acceleration and said reducing the deceleration:
  reducing the maximum velocity ($V_{max}$), maximum acceleration jerk ($J_a$), and/or maximum deceleration jerk ($J_d$) until the distance of the motion control profile is less than or equal to the desired trajectory length.

12. A non-transitory computer accessible memory medium storing program instructions for generating a trajectory for motion control, wherein the program instructions are executable to:
  receive specification of the trajectory, wherein said receiving the specification comprises receiving a geometry of the trajectory, wherein the geometry specifies a desired trajectory length;
  receive a plurality of constraints for the trajectory, wherein the plurality of constraints comprise one or more of a velocity, acceleration, or jerk constraint;
  generate a motion control profile based on the plurality of constraints;
  determine if a distance of the motion control profile exceeds the desired trajectory length specified by the geometry of the trajectory;
  in response to the distance of the motion control profile exceeding the desired trajectory length, decrease one or more values of the plurality of constraints for the trajectory to make the distance of the motion control profile less than or equal to the desired trajectory length.

13. The memory medium of claim 12, wherein said determining if the distance of the motion control profile exceeds the desired trajectory length comprises:
  determining a plurality of distance equations based on the motion control profile, wherein the plurality of distance equations each specify distance based on one or more of the plurality of constraints; and
  determining if a sum of the distance equations is greater than the desired trajectory length.

14. The memory medium of claim 12, wherein the plurality of constraints comprise: velocity, acceleration, deceleration, acceleration jerk, and deceleration jerk.

15. The memory medium of claim 12, wherein said generating the motion control profile comprises using an s-curve algorithm.

16. The memory medium of claim 15, wherein said determining if the distance of the motion control profile exceeds the desired trajectory length comprises:
  determining a plurality of kinematic equations for the motion control profile, wherein the plurality of kinematic equations comprise:

$$t_1 = A_{max} / J_a = t_3$$

$$t_2 = \frac{V_{max} - V_{ini}}{A_{max}} - \frac{A_{max}}{J_a}$$

$$t_5 = D_{max} / J_d = t_7$$

$$t_6 = \frac{V_{max} - V_{fin}}{D_{max}} - \frac{D_{max}}{J_d}$$

wherein $A_{max}$ is maximum acceleration;
wherein $D_{max}$ is maximum deceleration;
wherein $J_a$ is maximum acceleration jerk;
wherein $J_d$ is maximum deceleration jerk
wherein $V_{max}$ is maximum velocity;
wherein $V_{ini}$ is initial velocity;
wherein $V_{fin}$ is final velocity; and
wherein $t_1$, $t_2$, $t_3$, $t_5$, $t_6$ and $t_7$ are respective time periods.

17. The memory medium of claim 16, wherein said determining if the distance of the motion control profile exceeds the desired trajectory length comprises:
  determining if equation 1, $$\frac{V_{max} - V_{ini}}{A_{max}} < \frac{A_{max}}{J_a}$$

is true;
  wherein said decreasing the one or more values of the plurality of constraints comprises reducing $A_{max}$ in response to determining that the equation 1 is true.

18. The memory medium of claim 16, wherein said determining if the distance of the motion control profile exceeds the desired trajectory length comprises:
  determining if equation 2, $$\frac{V_{max} - V_{fin}}{D_{max}} < \frac{D_{max}}{J_d}$$

is true;
  wherein said decreasing the one or more values of the plurality of constraints comprises reducing $D_{max}$ in response to determining that the equation 2 is true.

19. The memory medium of claim 16, wherein said determining if the distance of the motion control profile exceeds the desired trajectory length comprises:
  determining a sum of a plurality of distance equations for the motion control profile, wherein the plurality of distance equations comprise:

$$s_1 = \frac{1}{6} Ja \cdot t_1^3 + V_{ini} \cdot t_1$$

$$s_2 = \frac{1}{2} Ja \cdot (t_1^2 \cdot t_2 + t_2^2 \cdot t_1) + V_{ini} \cdot t_2$$

$$s_3 = Ja \cdot \left(t_1^2 \cdot t_2 + \frac{5}{6} t_1^3\right) + V_{ini} \cdot t_1$$

$$s_5 = Jd \cdot \left(t_5^2 \cdot t_6 + \frac{5}{6} t_5^3\right) + V_{fin} \cdot t_5$$

$$s_6 = \frac{1}{2} Jd \cdot (t_5^2 \cdot t_6 + t_6^2 \cdot t_5) + V_{fin} \cdot t_6$$

$$s_7 = \frac{1}{6} Jd \cdot t_5^3 + V_{fin} \cdot t_5$$

wherein $s_1, s_2, s_3, s_5, s_6$ and $s_7$ are respective distances Ja is acceleration jerk; and Jd is deceleration jerk.

20. The memory medium of claim 19, wherein said decreasing one or more values of the plurality of constraints comprises:

reducing the acceleration $A_{max}$ such that $s_1$ and $s_3$ cover less than half of the desired trajectory length; and reducing the deceleration $D_{max}$ such that $s_5$ and $s_6$ cover less than half of the desired trajectory length.

21. The memory medium of claim 20, wherein the method further comprises:

in response to the distance of the motion control profile exceeding the desired trajectory length, after said reducing the acceleration and said reducing the deceleration:
reducing the maximum velocity ($V_{max}$), maximum acceleration jerk ($J_a$), and/or maximum deceleration jerk ($J_d$) until the distance of the motion control profile is less than or equal to the desired trajectory length.

22. A system, comprising:

a processor; and a memory medium storing program instructions for generating a trajectory for motion control, wherein the program instructions are executable by the processor to:

receive specification of the trajectory, wherein said receiving the specification comprises receiving a geometry of the trajectory, wherein the geometry specifies a desired trajectory length;

receive a plurality of constraints for the trajectory, wherein the plurality of constraints comprise one or more of a velocity, acceleration, or jerk constraint;

generate a motion control profile based on the plurality of constraints;

determine if a distance of the motion control profile exceeds the desired trajectory length specified by the geometry of the trajectory;

in response to the distance of the motion control profile exceeding the desired trajectory length, decrease one or more values of the plurality of constraints for the trajectory to make the distance of the motion control profile less than or equal to the desired trajectory length.

* * * * *